July 26, 1960
C W. MUSSER
2,946,235
THRUSTER
Filed Aug. 20, 1959
2 Sheets-Sheet 1
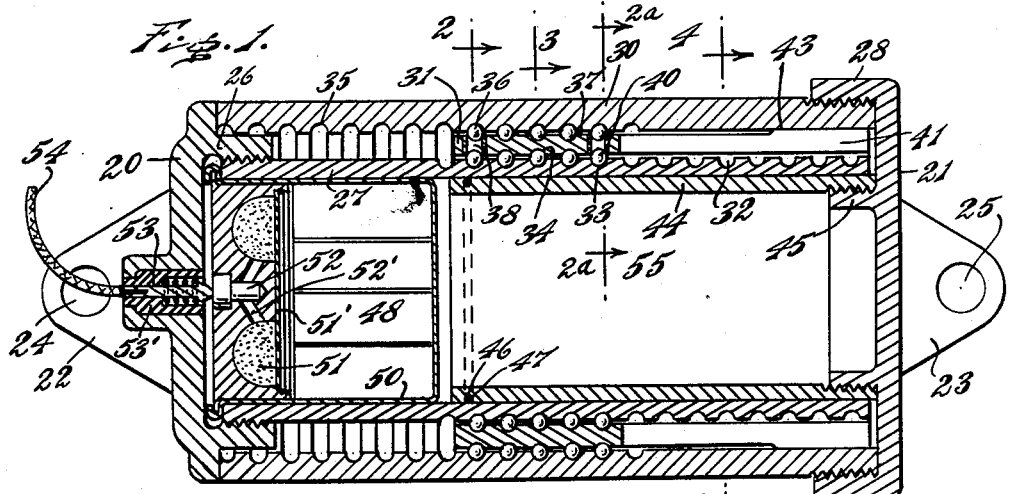
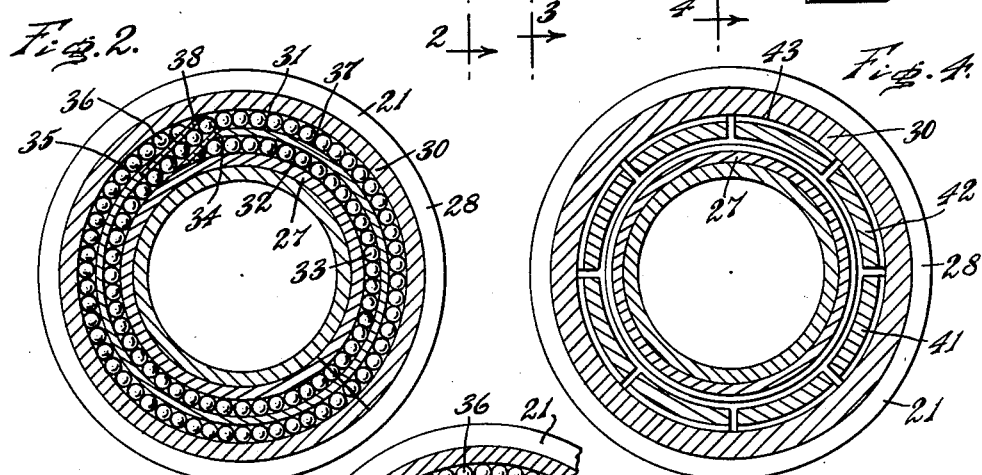
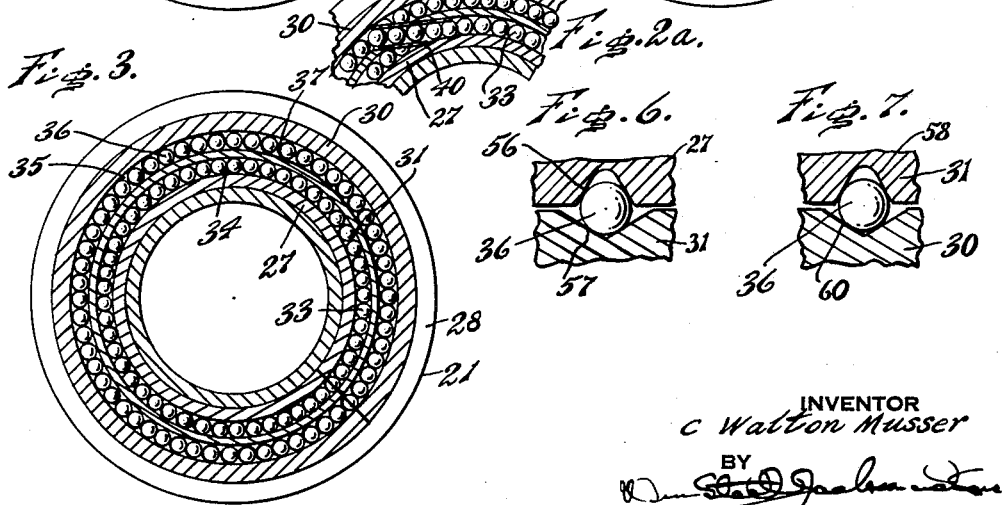
INVENTOR
C Walton Musser
BY
ATTORNEYS July 26, 1960  C W. MUSSER  2,946,235
THRUSTER Filed Aug. 20, 1959  2 Sheets-Sheet 2

INVENTOR
C Walton Musser
BY
ATTORNEYS.

United States Patent Office 2,946,235
Patented July 26, 1960

2,946,235
THRUSTER
C Walton Musser, Beverly, Mass., assignor to United Shoe Machinery Corporation, Boston, Mass., a corporation of New Jersey
Filed Aug. 20, 1959, Ser. No. 834,967
15 Claims. (Cl. 74—424.8)

The present invention relates to screw devices and to speed control mechanism.

A purpose of the invention is to provide relatively linear moving elements and to control the speed of motion of such elements by converting the linear motion into rotary motion and braking the rotary motion in response to centrifugal force.

A further purpose is to provide inner and outer telescoping elements, to interpose a nut between the telescoping elements, to thread the nut to the inner telescoping element by a thread having a pitch angle in one direction and to thread the nut to the outer telescoping element by a thread having a pitch angle in the opposite direction, and to mount on the nut brake shoes responsive to centrifugal force, which in static position are free from substantial braking action, and which, when turning rapidly, exert braking action conveniently against the outer telescoping element.

A further purpose is to provide a ball bearing nut between two inner and outer telescoping elements, having helical ball bearing grooves on the outside of the nut which are opposite to the helical ball bearing grooves on the inside of the nut.

A further purpose is to provide helical ball bearing grooves on the inside and outside of a ball bearing nut with crossover passages at points spaced along the axis of the nut so that the bearing balls can recirculate between the inner and outer grooves as relative motion occurs between the nut and the telescoping elements.

A further purpose is to recirculate bearing balls from inner and outer grooves of a ball bearing nut in which the grooves have opposite helical pitch angles.

A further purpose is to adjust the contact angle of the races of the opposite pitch angles so that the circumferential speed of both sets of balls are the same and there will be no tendency of the recirculating bearing balls to crowd.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

Figure 1 is a partially diagrammatic central axial section of a thruster according to the invention. The section jumps to follow the crossovers rather than cutting through them.

Figure 2 is a section on the line 2—2 of Figure 1. The section follows the spiral threads in the respective races. A line is placed radially to suggest that the threads are spiralling in opposite directions.

Figure 2a is a fragmentary section on the line 2a—2a of Figure 1, showing a crossover at the opposite end of the nut.

Figure 3 is a section on the line 3—3 of Figure 1. A line shows where the section jumps across the threads.

Figure 4 is a section on the line 4—4 of Figure 1.

Figures 6 and 7 are sections taken radially of the races showing different contact angles. The contact angles are exaggerated.

Figure 5:
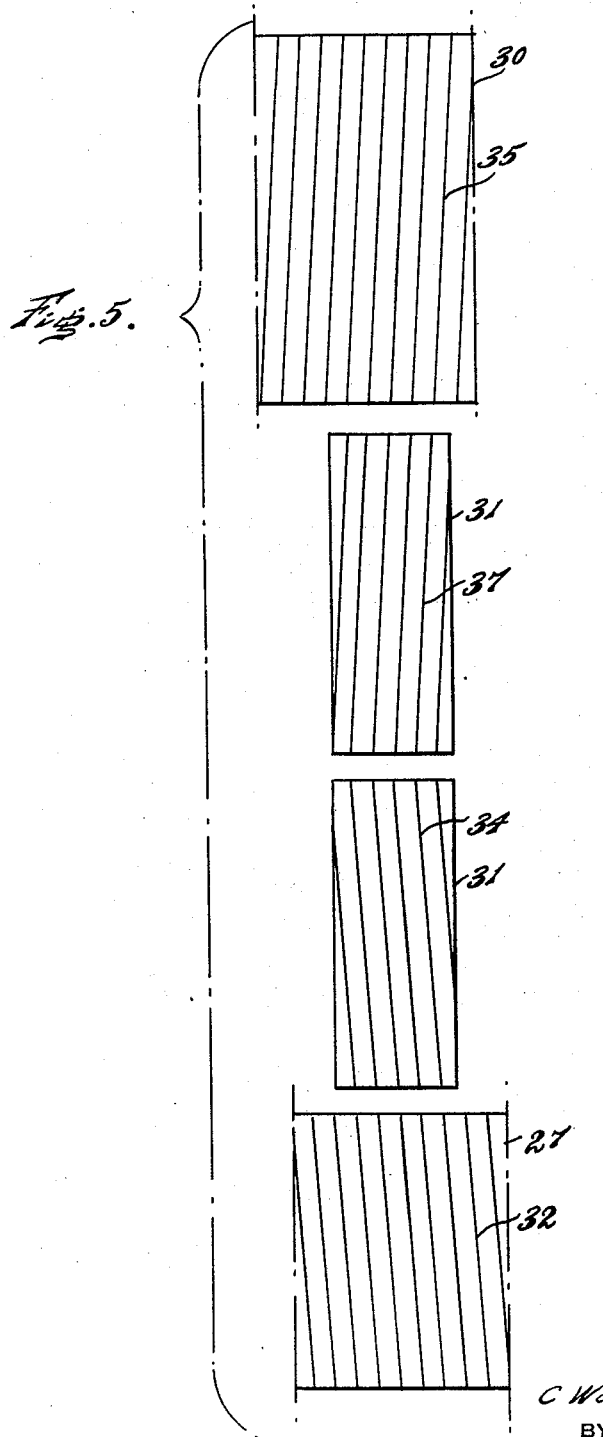
Figure 5 is an exploded diagrammatic development showing the pitch angle relationships of the ball bearing grooves on the telescoping elements and the nut in Figures 1 to 4, inclusive.

Describing in illustration but not in limitation and referring to the drawings:

The present invention relates to a new mechanical movement, which is applicable to many different mechanisms, but which is described with particular reference to the control of linear motion.

In accordance with the invention, a nut is interthreaded between inner and outer telescoping elements which are capable of moving linearly with respect to one another.

In the preferred embodiment of the invention the interthreading is accomplished by balls which extend in helical grooves partially in the nut and partially in the cooperating telescoping element.

Also in the preferred embodiment of the invention the helical angles of the grooves on the inside and outside of the nut are opposite so that one in effect has a left-hand thread and the other has a right-hand thread or vice versa.

In the preferred form of the invention the balls do not remain permanently in either the inside or outside groove of the nut but recirculate through crossover passages, suitably located at opposite ends of the nut and permitting balls to move from the inner groove to the outer groove and vice versa.

Thus the inner telescoping element has on its outside a helical groove or helical raceway which matches in helix angle and right or left character the cooperating helical groove of the raceway on the inside of the nut. Correspondingly the inside of the outside telescoping element has a helical groove or raceway which matches in helix angle and right or left-hand character the helical groove or raceway on the outside of the nut.

The balls recirculate between the inside and outside grooves or raceways on the nut, and if desired the contact angles of the grooves on the inside and the outside can be adjusted so that the planetary speed of the balls on the inside of the nut equals the planetary speed of the balls on the outside of the nut and the balls will therefore not tend to crowd during recirculation.

In the particular application of the invention shown, the ball bearing nut is used to convert linear motion to rotary motion and then to regulate or limit the motion by braking in proportion to the velocity.

Considering now the drawings in detail, the thruster of the invention comprises opposed thruster heads 20 and 21, each of which has in line with the axis a lug 22 or 23 which is provided with an opening 24 or 25 which connects by a suitable bolt or pin with a mounting at one end and with equipment which can be operated by the thruster at the other end. The head 20 has a threaded flange 26 which is interthreaded with an inner telescoping element 27 which extends axially of the thruster. The opposite head 21 has a threaded flange 28 which is interthreaded with a tube 30 which forms an outer telescoping element coaxial with the inner telescoping element 27 and adapted to move relatively longitudinally with respect to the inner telescoping element 27.

The outer and inner telescoping elements are in spaced relation so that there is adequate room for a nut 31 coaxial with the outer and inner telescoping elements to lie between them.

All of the inner telescoping elements, the outer telescoping element and the nut have cylindrical contours and circular cross sections as shown best in Figures 2, 3 and 4.

The outside of the inner telescoping element 27 has a helical groove or raceway 32 extending for an appreciable portion of its length and of a suitable contour to receive balls 33 which lie partially in the groove or raceway 32 and protrude therefrom. The inside of the nut 31 has a helical groove or raceway 34 which is of the same pitch angle and the same direction (left or right-hand) as the groove 32 in the outside of the inner telescoping element 27. Thus the grooves or raceways 32 and 34 follow the same path and cooperate and the same ball will have one side in the groove or raceway 32 and the other side in the groove or raceway 34, with the intermediate portion extending between as is usual in ball bearing screws.

The inside of the outer telescoping element 30 has a helical groove or raceway 35 which receives one side of balls 36 and the outside of the nut 31 has a helical groove or raceway 37 following the same path which receives the other side of the balls 36, the intermediate portions of the balls extending between the raceway 35 and the raceway 37.

The helical grooves or raceways 35 and 37 are of the same pitch angle and the same direction (left or right-hand).

Also in the preferred embodiment of the invention (as applied to the control of velocity) and for many other purposes, the direction (left or right-hand) of the pitch angles of the grooves or races 32 and 34 is opposite to that of the grooves or races 35 and 37.

In some cases the numerical values of the contact angles of the grooves or raceways 32 and 34 and the grooves or raceways 35 and 37 may be equal, but in a number of cases the numerical values of the contact angles are deliberately made different so that the circumferential speed of the balls in the inner and outer grooves of the nut will be the same to prevent crowding during recirculation as later explained.

At one axial end of the nut there is a spiral passage 38 mounted on the nut which connects the inner groove or raceway 34 and the outer groove or raceway 37 to permit the balls to recirculate, and at the opposite end of the nut there is a spiral passage 40 (Figure 2a) between the inner and the outer grooves or raceways 34 and 37 on the nut, which permits the balls to recirculate. It will be evident that in order to permit the balls to recirculate they are of the same diameter, and may conveniently be the type of metallic balls used in ball bearings.

The inner and outer telescoping elements and the nut itself may be made of any material suitable for ball bearings, preferably a steel of the character employed in ball bearing races.

It will be observed that the nut is supported inside and out by a multiplicity of balls, and therefore the nut can be comparatively thin in radial dimension.

It is not ordinarily necessary to use more than one crossover at each end notwithstanding the length of the nut, providing the thread is a single helix. If, of course, the thread is a multiple helix like a double helix there will have to be a crossover at each end for each helix. The circumferential length of the crossover grooves can be made relatively short, or, of course, they can be lengthened circumferentially, if desired, to provide for smooth flow at high velocity.

The nut has integral therewith at one end a collet 41 which has a plurality of segmental brake shoes 42 as best seen in Figures 1 and 4 which, by inherent spring properties of the collet, are free from tight engagement with a suitably smooth cylindrical portion 43 on the inside of the outer telescoping element 30 when the nut is stationary. When the nut is rotated rapidly, the action of the centrifugal force of the brake shoes 42 against the spring properties of the collet, firmly engage the brake shoes 42 against the inside surface 43 to exert brake action. For many purposes it will be sufficient to obtain the frictional drag of one metal surface on another, but it will be evident that increased frictional drag will be employed by using frictional material on the outside of the brake shoes or the inside of the outer telescoping member where it is desired. Amplification of the braking force can be obtained in any suitable way, as by appropriate cams or levers multiplying the centrifugal force.

For the purpose of guiding the telescoping members and keeping them aligned, a tubular guide 44 is threaded to a flange 45 on head 21 and extends axially in engagement with the inside of the inner telescoping member 27. Near the end remote from the head 21, annular groove 46 extends around the outside of the guide 44 and an O-ring of rubber or the like occupies the groove 46 and seals against the inside of the inner telescoping element 27 to permit pressurizing the closed space 55 without the entry of dirt into the raceways and to prevent the flow of lubricant, if any, away from the nut 31.

The device of the invention may be energized in any suitable way, a convenient manner being by slow burning explosive charge 48 contained within a frangible removable cartridge 50 which carries at its end adjoining the head 20 a fast burning booster charge 51 set off in any suitable manner, for example by an electric primer 52 grounded to the frame, protected by a plastic layer 51 and effective through gas ports 52', and connected by spring urged contact 53 in insulating cup 53' to wire 54.

It will be understood that the invention is applicable where the impulse which tends to move the telescoping elements is provided in any other suitable manner, for example hydraulically, mechanically, or electrically, and the illustration of the explosive charge to operate the device is merely made as an example.

The device of the invention is particularly useful for aircraft to operate as a thruster to manipulate release mechanism and the like. It has the advantage over existing emergency release devices that it can be made independent of other equipment on the airplane, including hydraulic systems, and electrical systems. If it is desired to avoid electrical operation, the detonator can be fired by hand using well known percussion firing mechanism.

In operation it will be evident that once the thruster operates, as for example by explosion of the explosive charge 48, the gases evolved in the closed space 55 inside the guide 44 start the heads 20 and 21 moving axially in relation to each other, and cause the telescoping elements 27 and 30 to begin to move longitudinally in relation to each other. As soon as the impulse to move longitudinally is applied to the telescoping elements 27 and 30, the threads or helical grooves tend to rotate the nut 31, the rotative impulse to the nut being imparted in the same direction by both the inner telescoping element 27 and the outer telescoping element 30 by means of the helical grooves and balls.

If desired the brake collet elements 43 can be arranged so that when the nut is stationary they just touch but do not apply braking action against the inside of the telescoping element 30. As soon as the nut begins to rotate, centrifugal force tends to force the brake shoe elements 43 outwardly against the spring action of the brake shoe elements themselves, and the brake shoe elements begin to rub with increasing frictional drag against the inside of the telescoping element 30 as the speed of rotation of the nut 31 increases. This increase in frictional drag therefore tends to slow down the rotation of the nut 31 as the nut speeds up, and since the telescoping elements 27 and 30 cannot move longitudinally except by rotation of the nut, the braking elements tend to slow down the speed of longitudinal motion of the telescoping elements relative to one another. Thus, notwithstanding the explosive charge which would tend to create a very rapid longitudinal motion of the telescoping elements, the braking action tends to slow down the motion of the telescoping elements and control the linear velocity so that it is relatively slow and relatively smooth.

Thus the centrifugal force regulates the speed of linear motion.

In most cases it may be desired to use the speed regulating device only to eliminate or control excessive speed which would otherwise be imparted by the explosive impulse. In this case the brake shoes are initially machined with a slight clearance from the inside of the telescoping element 30, and as the nut 31 begins to speed up, the brake shoes 43 do not grip or apply braking action until a predetermined rotational speed and centrifugal force are achieved. In this case the brake applies drag to retard linear motion in excess of a predetermined speed.

It will be evident that as the nut rotates there is a tendency for the balls in the inner and outer grooves to recirculate, and travel through the crossovers at the two ends of the groove. If desired the contact angles of the grooves to the rolling elements may be adjusted so that both sets of balls are at the same circumferential speed in relation to the rotating element or the nut and they will not tend to crowd.

Figures 6 and 7 show in a very exaggerated manner the change in the contact angles of the grooves so that both sets of balls will travel at the same circumferential speed. It will be understood that the contact angles will suitably vary only slightly plus or minus from 45 degrees but for the purpose of illustration the contact angles have been exaggerated. Figure 6 shows a smaller contact angle at 56 on the spiral race of the inner telescoping element 27 and a larger contact angle 57 on the inner race of the nut 31. Figure 7 shows a smaller contact angle 58 on the outer race of the nut 31 and a larger contact angle 60 on the inner race of the outer telescoping element 30.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a screw mechanism, an inner screw element having external helical grooves thereon with a helix extending in one direction, a nut outside the inner screw element having internal helical grooves thereon with the helix also extending in said one direction and conforming to the path of the external grooves on the inner screw, the nut also having external helical grooves thereon with the helix extending in the opposite direction, a tubular outer screw element surrounding the nut having internal helical grooves thereon in which the helix extends in said opposite direction and conforming to the path of the external grooves on the nut, bearing elements occupying in part the helical grooves on the inner screw element and the inner helical grooves on the nut and bearing elements occupying in part the outer helical grooves on the nut and the innner helical grooves on the tubular outer screw element.

2. A device of claim 1, in which the bearing elements are balls.

3. A device of claim 1, in which the bearing elements are balls of the same diameter, in combination with crossover means between the inner and outer grooves on the nut at each end of the nut.

4. A device of claim 1, in which the contact angle of the grooves in relation to the balls is adjusted so that the circumferential speed of both sets of balls is the same, whereby the balls do not tend to crowd.

5. In a control device, inner and outer telescoping elements, rotating means interthreaded to the telescoping elements and rotated by longitudinal displacement of the telescoping elements and brake means operated by the rotating means and retarding rotation as speed increases.

6. In a device to control speed of linear motion, inner and outer relatively linearly moving telescoping elements, there being opposite threads on the inside and outside of the telescoping elements, a nut interposed between the telescoping elements, said nut having external thread means which interengages with the internal threads on the outer telescoping element and having internal thread means which interengages with the external threads on the inner telescoping element, and brake elements on the nut occupying a normal position which is adjacent to but free from firm engagement with the interior of the outer telescoping element and which on rotation of the nut at increased speed will engage and brake against the interior of the outer telescoping element.

7. A device of claim 6, in which the brake elements on the nut engage and begin to apply braking action as soon as the nut begins to rotate.

8. A device of claim 6, in which the brake elements on the nut engage and begin to apply braking action at a predetermined speed of rotation of the nut.

9. In a device for controlling speed of translation, inner and outer telescoping elements in spaced relation to one another, there being a helical groove on the outside of the inner telescoping element and an opposite helical groove on the inside of the outer telescoping element, a nut interposed between the telescoping elements, the nut at the inside having a helical groove which conforms to the path of the helical groove on the inner telescoping element, and the nut at the outside having a helical groove which conforms to the path of the helical groove on the outer telescoping element, balls partly in the outer helical groove of the inner telescoping element and partly in the inner helical groove of the nut, balls partly in the inner helical groove of the outer telescoping element and partly in the outer helical groove of the nut, and brake shoe segments on the nut normally occupying a position free from firm engagement with the inside of the outer telescoping element and brought into firm engagement with the inside of the outer telescoping element when the nut rotates rapidly.

10. A device of claim 9, in which the brake shoe segments on the nut engage and apply frictional drag as soon as the nut begins to rotate.

11. A device of claim 9, in which the brake shoe segments on the nut engage and apply frictional drag at a predetermined rotational speed of the nut after the nut begins to rotate.

12. A device of claim 9, in which the balls are all of the same diameter, in combination with crossover means at the two ends of the grooves of the nut.

13. In a device which controls linear motion, a pair of relatively linearly moving components, means acting between the linearly moving elements for transferring the linear motion into rotatory motion and means responsive to the centrifugal force of the rotatory motion for braking the linear motion proportionally to the speed.

14. In a screw mechanism, inner and outer spaced cylindrical telescoping elements, a nut interposed between said inner and outer telescoping elements, there being cooperating helical ball receiving grooves on the outside of the nut and inside of the outer telescoping element, and there being cooperating ball receiving helical grooves on the inside of the nut and the outside of the inner telescoping element, crossover passages at spaced axial positions along the nut communicating between the inner and outer ball receiving grooves and a recirculating set of balls occupying the passages formed by the outer telescoping element and the outside of the nut and by the inner telescoping element and the inside of the nut, said set of balls extending throughout the grooves and cross communicating through the crossover passages.

15. A device of claim 14, in which the grooves between the inside of the outer telescoping element and the outside of the nut are of opposite pitch angle from the grooves between the outside of the inner telescoping element and the inside of the nut.

References Cited in the file of this patent

UNITED STATES PATENTS 2,791,128    Geyer et al.    May 7, 1957
2,891,413    Millns    June 23, 1959